May 14, 1968  R. J. NOVOTNY ET AL  3,382,677
ROCKET THRUST CHAMBER PROPELLANT INJECTOR
Filed Feb. 14, 1966
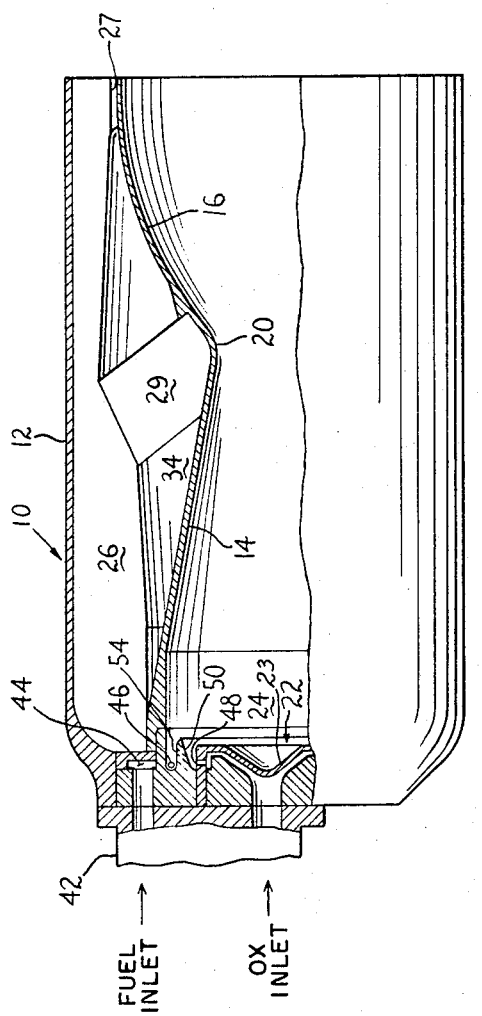
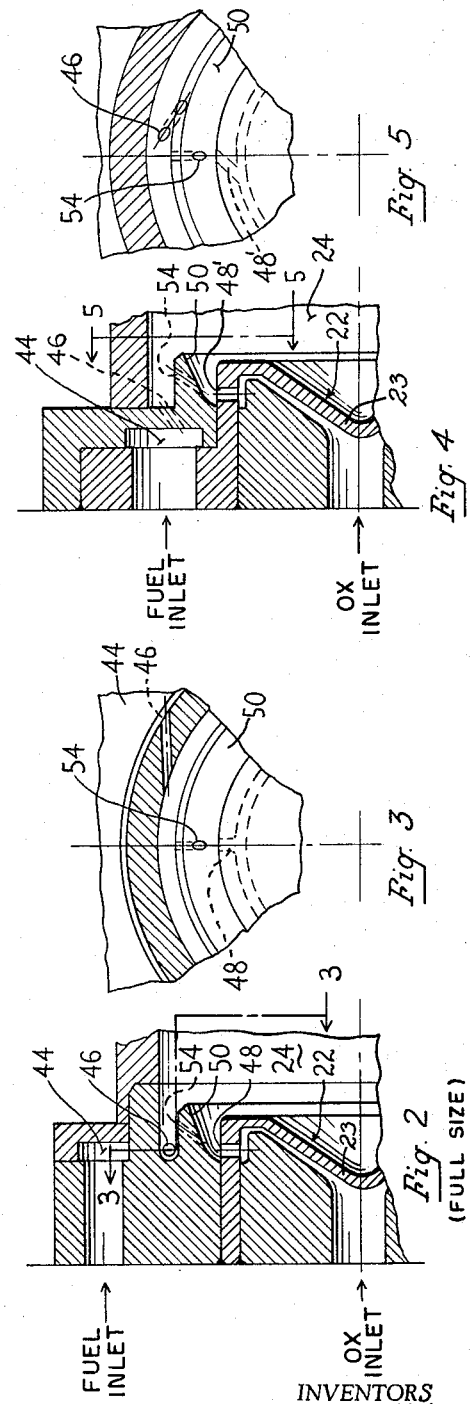
INVENTORS
RAYMOND J. NOVOTNY
WALTER N. JOHANSSON
BY
AGENT

United States Patent Office 3,382,677
Patented May 14, 1968

3,382,677
ROCKET THRUST CHAMBER PROPELLANT INJECTOR
Raymond J. Novotny, Sparta, and Walter N. Johansson, Morris Plains, N.J., assignors to Thiokol Chemical Corporation, Bristol, Pa., a corporation of Delaware
Filed Feb. 14, 1966, Ser. No. 527,319
7 Claims. (Cl. 60—258)

ABSTRACT OF THE DISCLOSURE

A full diameter vortex injector for rocket thrust chambers having baffle means for preventing the substantial mixing of or the uncontrolled mixing of hypergolic propellants until an effective chamber wall, liquid cooling film is formed. One of the propellants being injected tangentially to form the cooling wall film with the other propellant being radially injected against a baffle which directs its axially downstream for intermixing with the vortex film.

---

This invention relates generally to rocket thrust chambers and more particularly to an improved injector therefor.

Full diameter vortex injectors are known in the art and are utilized in rocket thrust chambers, among other reasons, because of their film cooling characteristics which enhance the life of the chamber regardless of various other chamber cooling means and constructions employed in combination therewith.

However, most known constructions employing injector film cooling effects have the extreme disadvantage of being unable to structurally ensure that the propellants are maintained apart to effect film cooling of the chamber wall (usually with the fuel) and at the same time mix rapidly at the point or area of intended ignition. Obviously, in the case of hypergolic propellants, this is a delicate situation that requires optimization of what appear to be paradoxical requirements.

Where attempts have been made to structurally segregate hypergolic and other propellants to achieve effective film cooling of the chamber wall the disadvantage arises in that the propellants do not mix and combust rapidly enough and therefore lack the necessary flexibility as to type of operation required of current day thrust chambers which must be able to be pulsed, throttled, and operated off-design. For example, these known structures are incapable of the fast response (approximately 5–10 milliseconds) ignition required in the rapid pulsing common to certain duty cycles.

Accordingly, the main object of the present invention is to provide an improved full diameter vortex for use with rocket thrust chambers which will obviate the above and other undesirable characteristics of known vortex injectors.

An important object of the present invention is to provide an improved vortex injector for rocket thrust chambers in which means are provided for preventing uncontrolled mixture of the propellants until after an effective chamber wall, liquid cooling film is formed.

A further important object of the present invention is to provide an improved vortex type of injector for use with hypergolic propellants in a rocket thrust chamber in which means are provided for permitting limited ignition of the propellants before the establishment of an effective chamber wall, liquid cooling film so as to permit the rapid pulsing of the thrust chamber as required by certain fast response and lengthy duty cycles.

Other objects and advantages of the invention will become apparent during the course of the following description.

In the drawings two embodiments of the invention are shown. In these showings:

FIGURE 1 is a central longitudinal sectional view of one form of the invention as used with hypergolic propellants in a thrust chamber;

FIGURE 2 is a fragmentary, central longitudinal sectional view to an enlarged scale of the propellant injector of the invention;

FIGURE 3 is a fragmentary transverse sectional view thereof taken on the line 3—3 of FIGURE 2;

FIGURE 4 is a fragmentary, central longitudinal sectional view of a modified form of the propellant injector; and FIGURE 5 is a fragmentary transverse sectional view thereof taken on the line 5—5 of FIGURE 4.

Referring to the drawings, numeral 10 designates as a whole a rocket thrust chamber with which the injector comprising the present invention may be employed and which may comprise an outer combustion chamber wall or jacket 12 preferably of stainless steel and an inner combustion chamber wall or liner 14 which terminates aft or downstream in an exhaust nozzle 16. The thrust chamber is closed at its left or upstream end by a circular, full diameter vortex injector assembly 22 which defines a propellant injector chamber or fuel coolant annulus 24 with the thrust chamber for the injection of the hypergolic propellants therein. The other propellant (oxidizer) is injected downstream as will be explained. Thus, only one of the propellants (fuel in this case but which may be oxidizer) is injected into the coolant annulus or chamber 24 which coolant-wise, is essential to offset the heat of the hot gas eddies which are always upstream of the flame front, to thus provide a longer life for the affected surfaces.

The pressurized hypergolic propellants are delivered by conduits (not shown) to a propellant manifold housing 42 containing a pair of close coupled, on/off squib or electrically actuated valves (not shown) for the control of the fuel and the oxidizer. During operation of the thrust chamber, the fuel is supplied to an annular volute passage 44 and then to a group of circumferentially spaced, tangential orifices 46 in the injector head 22 which are spaced upstream therealong from a group of circumferentially spaced radially directed, oxidizer orifices 48. The two groups of orifices are separated by an annular splash plate 50 which has an arcuate aft or downstream face to deflect the oxidizer downstream away from the fuel being injected into the coolant annulus or injection chamber 24.

Upon leaving the tangential orifices 46, the fuel streams impinge the wall of the injection chamber or coolant annulus 24 and, being shielded by the oxidizer splash plate 50, a strong vortex film develops and spreads downstream to cool the injection chamber and coolant annulus 24 and combustion chamber walls 14.

The oxidizer is supplied centrally of the injector 22 assembly, regeneratively cools the oxide-insulated concave head spud 23 and then flows through the radial orifices 48 in streams which impinge and film cool the oxidizer splash plate 50. The oxidizer is thus deflected and fans outwardly to form a conical sheet directed downstream away from the fuel injection orifices 46, and increases the liquid phase mixing area of the oxidizer with the fuel. It is to be noted that the individual groups of fuel and oxidizer orifices 46, 48 are in radial alignment so that the oxidizer splash plate 50 extends downstream from the orifices.

An important feature of the invention which is necessary for the rapid pulsing (MIB's) in milliseconds required by certain duty cycles, resides in the provision of circumferentially spaced outwardly canted, pilot ignition ports 54 which are drilled in the oxidizer splash plate to reduce ignition delay by permitting a small amount of oxidizer to flow directly to the fuel film.

FIGURES 4 and 5 disclose a modified form of the vortex propellant injector assembly 22 wherein similar parts bear similar numerals. This form of the invention differs from that disclosed in FIGURES 1–3 only in that the oxidizer holes 48' are also tangential to promote vortex flow (FIGURE 4) and the fuel injection orifices 46' have a doubly oblique arrangement (e.g. 30° from the tangential and 30° from the lateral). (FIGURE 5.)

The forms of the invention disclosed are remarkably efficient in operation. Instead of the "billboards" or standing waves of liquid propellant normally existing between the liner 14 contact area of each set of injection orifices, which waves possess only a small amount of vortex motion and cause erosive streaking of the chamber wall and nozzle throat to place an added thermal and durability burden on the combustion cavity, the disclosed form greatly improves combustion efficiency so that the "billboards" are replaced by a rearwardly deflected, uniform fan which blends and mixes with the fuel coolant film with a minimum of interference therewith.

In addition to the efficiencies described, engine reliability is promoted in both forms of the injector as the possibility of oxidizer splashing back into the fuel orifices and causing combustion to occur in the fuel manifold is eliminated. It will be apparent that performance can not only be "dialed" by radial orientation of propellant orifices but also "tailored" by simply changing the oxidizer splash plate ramp angle or arcuateness. This angle controls the axial impingement location of the oxidizer on the combustion chamber wall downstream of the injector. Injector durability is increased as the liquid phase mixing and combustion takes place uniformly downstream and away from the oxidizer spud, and chamber durability is also increased as the liquid vortex cooling film has a minimum of interruption as the splash plate prevents direct impingement by the oxidizer streams.

The fuel injection orifices of FIGURES 4 and 5 are not subject to the machining variations found in the tangential port designs and their fabrication is not so critical. The basic diameter of the annular supply passage 44 is reduced and provides lesser weight and profile size and quicker response time. Thus, the two forms of vortex injector shown provide direct effective cooling of the thrust chamber 10.

It will now be apparent that the novel thrust chamber injection means comprising the present invention will: enable longer firing durations and thrust chamber life; afford flexibility of application as it can be pulsed, throttled and operated off-design; and be economic as its versatility and design simplicity enable fabrication savings.

It is to be understood that the forms of the invention herewith shown and described are to be taken as a preferred example of the same and that various changes in the shape, size and arrangement of parts may be resorted to without departure from the spirit of the invention or the scope of the subjoined claims.

We claim:
1. An injector for a rocket thrust chamber having a combustion chamber terminating in a nozzle comprising a circular injector head projecting into the head of the combustion chamber and defining an annular injection chamber therewith; radially spaced circumferentially arranged groups of propellant orifices formed in said injector head for injecting separate hypergolic propellants into said injector chamber and into said combustion chamber for combustion in the latter, and an arcuate splash plate formed on said injector head between said groups to prevent substantial premature mixing of said propellants, each of the radially outer group of said orifices being arranged to discharge propellant tangentially into said injection chamber, and each of the radially inner group being arranged to discharge against said plate so as to deflect propellant to a point downstream of the injection chamber before combining with said tangentially discharged propellant for combustion therewith in said combustion chamber.

2. The combination recited in claim 1 wherein said radially spaced groups or orifices are in radial alignment.

3. The combination recited in claim 1 wherein a plurality of passages are formed in said splash plate to permit limited passage of and initial mixing and ignition of said propellants.

4. The combination recited in claim 3 wherein said radially spaced groups of orifices are in radial alignment.

5. The combination recited in claim 1 wherein a plurality of passages are formed in said splash plate to permit permit limited passage of and initial mixing and ignition of said propellants.

6. The combination recited in claim 1 wherein each of the radially outer group of said orifices is arranged to discharge propellant "at a 30° angle from both the tangential and lateral directions" into said injection chamber, and each of the radially inner group is arranged to discharge against said plate so as to deflect propellant to a point downstream of the injection chamber before combining with said tangentially discharged propellant for combustion therewith in said combustion chamber.

7. The combination set forth in claim 6 with the radially inner injection orifices directed tangentially.

References Cited
UNITED STATES PATENTS

| | | | |
|---|---|---|---|
| 2,749,706 | 6/1956 | Goddard | 60—238 |
| 2,774,216 | 12/1956 | Allen | 60—258 |
| 2,929,208 | 3/1960 | Schultz | 60—258 |
| 3,000,184 | 9/1961 | Fish | 60—258 |

MARTIN P. SCHWADRON, *Primary Examiner.*

MARK NEWMAN, *Examiner.*

D. HART, *Assistant Examiner.*